US011528745B2

(12) United States Patent
Tejedor et al.

(10) Patent No.: US 11,528,745 B2
(45) Date of Patent: Dec. 13, 2022

(54) COOPERATION BETWEEN NODES OPERATING IN LICENSED AND UNLICENSED SPECTRUM FOR CHANNEL ACCESS IN UNLICENSED SPECTRUM

(71) Applicant: Telefonaktiebolaget LM Ericsson (publ), Stockholm (SE)

(72) Inventors: Erika Tejedor, Stockholm (SE); Gary Boudreau, Kanata (CA); Muhammad Kazmi, Sundbyberg (SE); Imadur Rahman, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 13 days.

(21) Appl. No.: 16/346,159

(22) PCT Filed: Nov. 4, 2016

(86) PCT No.: PCT/SE2016/051089
§ 371 (c)(1),
(2) Date: Apr. 30, 2019

(87) PCT Pub. No.: WO2018/084757
PCT Pub. Date: May 11, 2018

(65) Prior Publication Data
US 2020/0059962 A1 Feb. 20, 2020

(51) Int. Cl.
*H04W 74/08* (2009.01)
*H04W 76/14* (2018.01)
*H04W 16/14* (2009.01)

(52) U.S. Cl.
CPC ....... *H04W 74/0808* (2013.01); *H04W 16/14* (2013.01); *H04W 76/14* (2018.02)

(58) Field of Classification Search
CPC .......................... H04W 74/0808; H04W 76/14
See application file for complete search history.

(56) References Cited

U.S. PATENT DOCUMENTS

| 2016/0071417 A1* | 3/2016 | Lewis | .................... | G08G 1/162 |
| | | | | 701/301 |
| 2016/0278088 A1 | 9/2016 | Cheng et al. | | |
| 2017/0118784 A1* | 4/2017 | Chen | .................... | H04W 76/14 |
| 2018/0124749 A1* | 5/2018 | Park | .................... | H04W 74/08 |

FOREIGN PATENT DOCUMENTS

| WO | 2016009480 A1 | 1/2016 |
| WO | 2016148632 A1 | 9/2016 |

\* cited by examiner

*Primary Examiner* — Zhensheng Zhang
(74) *Attorney, Agent, or Firm* — Christopher & Weisberg, P.A.

(57) ABSTRACT

This disclosure pertains to a method for operating a terminal (10) in a wireless communication network. The method comprises performing a Listen-Before-Talk, LBT, procedure on at least one LBT communication link of a set of LBT communication links, wherein performing the LBT procedure is based on 475 information received by the terminal (10), the received information pertaining to operational conditions of the LBT communication links of the set of LBT communications links. The disclosure also pertains to related devices and methods.

4 Claims, 12 Drawing Sheets

| 5.850 GHz | | | | | | | | | 5.925 GHz |
|---|---|---|---|---|---|---|---|---|---|
| 5.850-5.855 reserve 5 MHz | CH172 service 10 MHz | CH174 service 10 MHz | CH176 service 10 MHz | CH178 control 10 MHz | CH180 service 10 MHz | CH182 service 10 MHz | CH184 service 10 MHz |
| | | CH175 | | | CH181 | | |

Fig. 3

| | 5855 | 5875 | 5905 | 5925 MHz |
|---|---|---|---|---|
| | Potential non-safety ITS | Safety-ITS | Possible ITS | |
| | ECC REC (08)01 | EC DEC 2008/671/EC | EC DEC (08)01 | |

Fig. 4

COOPERATION BETWEEN NODES OPERATING IN LICENSED AND UNLICENSED SPECTRUM FOR CHANNEL ACCESS IN UNLICENSED SPECTRUM

TECHNICAL FIELD

The present disclosure pertains to wireless communication networks and related devices and methods, in particular in the context of Listen-Before-Talk techniques. The approaches described herein are suitable, and may be described in the context of, 3GPP LTE/LTE Evolution networks. However, they are generally applicable also in particular for 5G technologies, e.g. 3GPP NR (New Radio).

BACKGROUND

Wireless communication systems, in particular cellular telecommunication systems, use increasingly larger frequency ranges, covering parts of the spectrum that requires (e.g., due to regulations/laws) Listen-Before-Talk (LBT) to be performed before transmissions. At the same time, the number of carriers each device communicates on increases, e.g. by using carrier aggregation and/or dual connectivity. Communication on a large number of carriers or communication links, which include LBT carriers or communication links, carrier or communication links requiring a LBT procedure, brings new problems, e.g. re: power efficiency.

SUMMARY

It is an object of the present disclosure to provide approaches improving handling of, and/or communication on, LBT communication links. This may in particular be relevant in wireless communication networks allowing D2D communication next to cellular communication.

Accordingly, there is described a method for operating a terminal in a wireless communication network. The method comprises performing a Listen-Before-Talk, LBT, procedure on at least one LBT communication link of a set of LBT communication links, wherein performing the LBT procedure is based on information received by the terminal, the received information pertaining to operational conditions of the LBT communication links of the set of LBT communications links. Thus, the received information allows the terminal to decide on which LBT communication link a LBT procedure is to be performed, and on which not. It should be noted that transmission on a LBT communication link requires a LBT procedure to be carried out (successfully, indicating that transmission is allowed). A terminal may comprise a LBT module for performing such a LBT procedure.

The terminal may receive the information from a radio node, e.g. a network node or another terminal. In a variant, the terminal may comprise a receiving module for such receiving.

There may be considered a terminal for a wireless communication network. The terminal comprises Listen-Before-Talk, LBT, circuitry, and is adapted for using the LBT circuitry for performing a Listen-Before-Talk, LBT, procedure on at least one LBT communication link of a set of LBT communication links. Performing the LBT procedure is based on information received by the terminal, the received information pertaining to operational conditions of the LBT communication links of the set of LBT communications links. Alternatively to the LBT circuitry, the terminal may comprise a LBT module with the described functionality of the LBT circuitry. It may be considered that the LBT circuitry represents and/or is implemented in a LBT module, or vice versa. LBT circuitry may generally be seen as form of radio circuitry and/or control circuitry. In some approaches, LBT circuitry may be considered to share components with control circuitry and/or radio circuitry.

The terminal may be adapted for receiving the information from a network node or another terminal. The terminal may comprise corresponding receiving circuitry (e.g., a receiver and/or transceiver), and/or a corresponding receiving module.

In a further approach, there is described a method for operating a radio node or network node in a wireless communication network. The method comprises transmitting information pertaining to operational conditions of the Listen-Before-Talk, LBT, communication links of a set of LBT communication links. The radio node or network node may comprise a transmitting module for such transmitting.

Moreover, there is disclosed a network node for a wireless communication network. The network node comprises transmitting circuitry and is adapted for using the transmitting circuitry for transmitting information pertaining to operational conditions of the Listen-Before-Talk, LBT, communication links of a set of LBT communication links. The transmitting circuitry may represent and/or be implemented as transmitting module, or vice versa.

The information pertaining to operational conditions may pertain to load and/or traffic on the LBT communication links. The method may comprise, and/or the radio node or network node, respectively control circuitry and/or a monitoring module thereof, may be adapted for, monitoring a plurality of communication links, which may comprise the set of LBT communication links, to determine the information, e.g. by monitoring traffic and/or load and/or average usage and/or average level of power/energy or related density. Such monitoring may be based on measurements, and/or on scheduling information, e.g. representing scheduling performed by the network node, and/or scheduling information received from another node, e.g. another network node.

There may also be considered a program product comprising instructions causing control circuitry to perform and/or control any one of the methods described herein. Also, there may be considered a carrier medium arrangement carrying and/or storing any of the program products described herein, and/or instructions causing control circuitry to perform and/or control any one of the methods described herein. Instructions may generally be computer-executable, and/or executable by control circuitry, respectively by a processor or controller thereof.

Generally, it may be considered that the LBT communication links of the set of LBT communication links comprise and/or are D2D communication links. In particular, it may be considered that the LBT communication link/s a LBT procedure is performed on is or are D2D communication links. Alternatively or additionally, LBT communications links of the set and/or links a LBT procedure is performed in may be in or of a carrier aggregation and/or be LAA links.

The information pertaining to operational conditions may generally pertain to load and/or traffic on the LBT communication links. Information may be represented and/transmitted as parameter/s and/or indicator/s, which may parametrize and/or indicate the information, e.g. implicitly and/or explicitly. A parameter and/or indicator may for example index a table, and/or represent a normalized and/or averaged value. Operational conditions may generally comprise traffic and/or load on a link (represented e.g., by average data rate and/or peak data rate and/or number of users, e.g. terminals and/or radio nodes and/or network nodes accessing the link, and/or by information pertaining to interference, e.g. SIR and/or SINR and/or SNR), usage level (represented e.g., by power and/or energy and/or respective density/ies on the link, e.g. averaged and/or peal values), and/or time of usage, represented, e.g., by a parametrization of the time the link is used for transmission, for example as a ratio over total time or over time the link is not used for transmission). In some cases, information pertaining to operational conditions may pertain to, and/or represent signal levels and/or signal patterns of the LBT communication links of the set and/or associated carriers or channels. It may be considered that the information pertains to operational conditions comprise, and/or is represented by, one or more indicators or indications explicitly or implicitly indicating whether to perform a LBT procedure on associated links and/or carriers. Operational conditions may comprise combinations of such. A parametrization may generally comprise one or more parameters and/or indicator/s.

Information may be received (and/or the terminal may be adapted to receive the information) in one or more messages, e.g. control messages, and/or on a control channel, which may be a physical control channel. The information may be transmitted and/or received cellularly, e.g. in DL, or some cases in D2D communication, in sidelink (SL). The radio node or network node may comprise a transmitting module and/or transmitting circuitry to transmit the information accordingly. The terminal may comprise correspondingly adapted receiving circuitry and/or control circuitry, and/or a corresponding receiving module.

Performing a LBT procedure on a LBT communication link may comprise performing a LBT procedure on one or more carriers and/or channels and/or frequencies and/or frequency ranges of or associated to the LBT communication link, for transmission by the terminal, e.g. in uplink and/or a sidelink or D2D communication. Such a procedure does not necessarily have to be performed on all carriers and/or channels and/or frequencies and/or ranges of the communication link. It may generally be considered that performing a LBT procedure based on information pertaining to operational conditions comprises determining, for LBT communication links of the set of LBT communications links, whether to perform a LBT procedure and/or whether to try to access the respective link/s for transmission (accessing a link may require a successful LBT procedure). Based on the information, it may be determined not to perform the LBT procedure, and/or to not try to access the LBT communication link, respective associated carrier/s, for transmission.

Performing a LBT procedure may comprise transmitting signaling on a LBT communication link or carrier on which a (successful) LBT procedure has been performed. Such transmitting may comprise performing power control on the transmitted signaling based on the received information, in particular on information pertaining on other communication links than the one transmitted on, e.g. information pertaining to neighboring frequency bands or carriers. For example, if the information indicates that load or traffic is low, and/or to limit interference, a low power may be used for transmitting. The terminal may comprise transmitting circuitry for use in such transmitting, and/or a corresponding transmitting module.

It may be considered that performing an LBT procedure comprise transmitting control information to another terminal and/or network node, the control information being based on the information received and/or based on performing a LBT procedure.

A LBT communication link may generally comprise and/or represent one carrier respectively the associated frequency band or channel. In some variants, a link may however comprise a plurality of carriers, e.g. in carrier aggregation. A LBT procedure may generally be performed on one carrier, e.g. on a specific carrier basis, but in some cases carriers may be combined for such LBT procedure (e.g., if the bandwidth of the carriers for transmission according to the standard used in combination roughly is equal to, or smaller than, the bandwidth of a frequency band and/or channel for which the LBT requirements are defined). Performing a LBT procedure may comprise performing more than one LBT procedure, e.g. at least one LBT procedure for different carriers and/or channels. It may generally be considered that a LBT communication link is a V2X link, e.g. a V2V or V2I or V2P link, in particular a sidelink for such V2X.

BRIEF DESCRIPTION OF THE DRAWINGS

The drawings are provided to illustrate and elucidate the approaches described herein and are not intended to limit their scope.

The drawings comprise:

FIG. 3, showing shared spectrum according to a US regulation;

FIG. 4, showing shared spectrum according to a European regulation;

DETAILED DESCRIPTION

In the following, reference is made to LTE by way of example. However, the approaches described herein are not necessarily limited to LTE based systems.

During Release 12, the LTE standard has been extended with support of device to device (D2D) (specified as "sidelink" or ProSE, Proximity SErvices) features targeting both commercial and Public Safety applications. Some applications enabled by Rel-12 LTE are device discovery, where devices are able to sense the proximity of another device and associated application by broadcasting and detecting discovery messages that carry device and application identities. Note that in other D2D implementations, discovery is a feature that provides a short message broadcast service, and is not associated with a "device detection" or "discovery process". Another application consists of direct communication based on physical channels terminated directly between devices.

D2D operation is a generic term which may comprise transmission and/or reception of any type of D2D signals (e.g. physical signals, physical channel, etc.) by a D2D communication capable UE and/or by D2D discovery capable UE. D2D operation may comprise D2D transmission, D2D reception, D2D communication, D2D discovery, etc.

D2D UE may generally be referred to as proximity services (ProSe) capable UE. Similarly, D2D operation may be referred to as ProSe operation. A D2D discovery capable UE may also be referred to as UE capable of ProSe direct discovery, and a D2D direct communication UE may be referred to as UE capable ProSe direct communication. D2D operation may also be called ProSe operation or sidelink operation. The link and/or carrier that is used for the ProSe direct communication and ProSe direct discovery between UEs is referred to as sidelink. The ProSe operation performed by the UE may broadly comprise of ProSe reception (i.e. receiving ProSe signals) and/or ProSe transmission (i.e. transmitting ProSe signals). The UEs discussed herein are examples and representatives of terminals. It should be noted that a RSU and/or infrastructure device adapted for sidelink/D2D communication may be considered a user equipment or terminal in the context of this disclosure.

One of the potential extensions for the device to device work consists of support of V2X communication, which includes any combination of (direct) communication between vehicles, pedestrians and infrastructure. V2X communication may take advantage of a NW infrastructure, when available, but at least basic V2X connectivity should be possible even in case of lack of coverage. Providing an LTE-based V2X interface may be economically advantageous because of the LTE economies of scale and it may enable tighter integration between communications with the NW infrastructure called vehicular to infrastructure (V2I) and vehicular to pedestrian (V2P) and vehicular to vehicular (V2V) communications, as compared to using a dedicated V2X technology.

Figure 1:
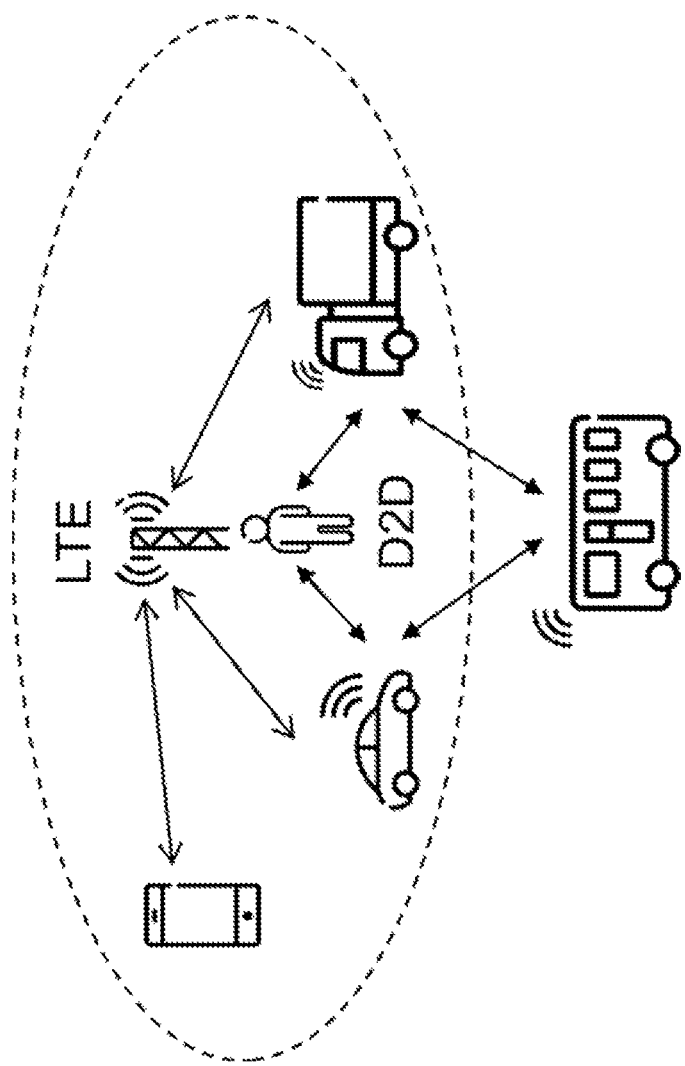
FIG. 1, showing a LTE/D2D setup for V2X.

FIG. 1 shows an exemplary setup for V2x scenarios for an LTE-based NW (network).

Figure 2:
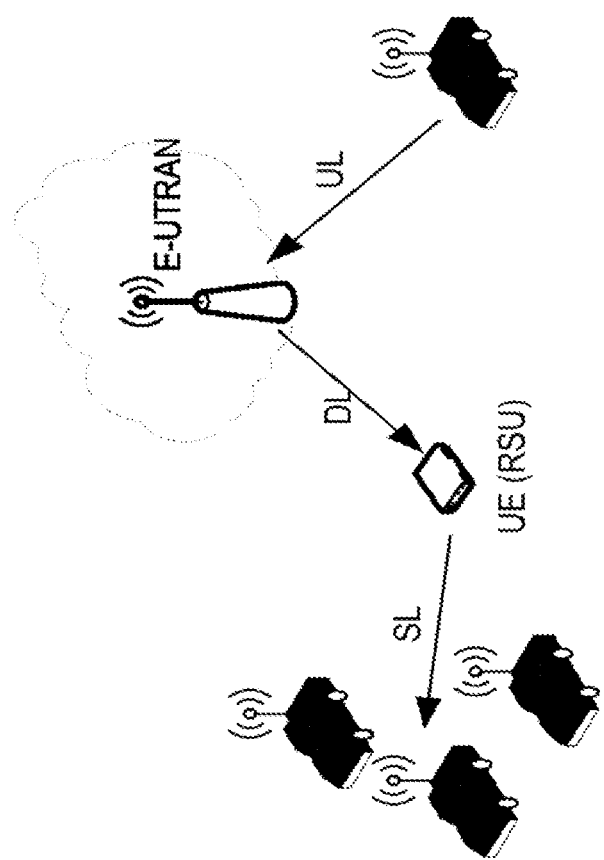
FIG. 2, showing a V2X setup.

V2x communications may carry both non-safety and safety information, where each of the applications and services may be associated with specific requirements sets, e.g., in terms of latency, reliability, capacity, etc. V2V and V2I can be implemented in both licensed or unlicensed spectrum via a Sidelink communication, while V2N may be supported via licensed spectrum (with UL and DL). In the most complete scenario, the devices are communicating with the network (V2N) and they also communicate among them (V2I/V2V), see FIG. 2. V2X communication may interchangeably be referred to as V2X operation, V2X transmission, V2X reception etc. A Road Side Unit (RSU) may be seen as part of infrastructure to which a vehicle is connected for V2I communication.

In V2X operation in unlicensed band, the V2X device senses the channel (e.g., in a LBT procedure) in order to determine the available resources (e.g. subframes, resource blocks, etc.) for transmission on sidelink. The V2X UE determines the availability of the resources by receiving signals (e.g. decoding preambles or pilot sequences) of other V2X UEs during certain time period (T1) (e.g. 1 second). The V2X reserves the available resources, which are not used by other V2X UEs, for transmission over certain period of time (T2) (e.g. 1 second). During T2 the V2X UE can transmit signals to other V2X UEs on the reserved resources.

LAA and Frame Structure Type 3 (FS3) are discussed in the following.

Frame Structure type 3 or FS3 (the frame structure type 3 is specified in 3GPP TS 36.211) has been defined in Rel-13 timeframe. In frame structure 2 or FS2 (a.k.a. TDD), a number of specific UL and DL subframe combinations are defined, while FS3 provides full flexibility in terms of UL/DL subframe combinations within a frame (or within certain time period).

License assisted access (LAA) of LTE was introduced in LTE Rel-13. LAA refers to the downlink carrier aggregation operation of at least one carrier in unlicensed spectrum with at least another carrier in any licensed spectrum. One such example is unlicensed carrier(s) Band 46 (the spectrum is also used for WiFi access), e.g., a UE can be configured with carrier aggregation with PCell in Band 1 (licensed spectrum) and SCell in Band 46 (unlicensed spectrum). In future, it is expected to have more unlicensed bands, thus LAA operations will be very prominent for future wireless systems. LAA operation is expected to be based on FS3. In later stages, unlicensed usage of LTE is expected to be extended to both DL and UL aggregation. Also, standalone LTE usage in unlicensed band will also be defined, that means single carrier LTE in an unlicensed band or both PCell and SCell in an unlicensed band will be designed. Future extensions also include aggregation of licensed and unlicensed carriers in inter-band dual connectivity manner. In LAA or, more generally, carrier aggregations with at least one licensed and one unlicensed (or LBT) carrier, main control signaling may be carried on the licensed carrier. A licensed carrier may be seen as an example of a non-LBT carrier.

An eNB (eNodeB, a LTE base station) operating in the unlicensed band only transmits signals which may be used for UE measurements using so called discovery reference symbols (DRS). Unlike release 8 CRS (common reference symbols), DRS is not transmitted in every subframe, and is instead transmitted periodically (e.g. every 160 ms).

Listen-Before-Talk (LBT) operation, in particular in LAA is discussed in the following.

The eNB may perform so called listen before talk (LBT) procedures to check that no other node (such as another eNB or a WiFi access point or another terminal) is transmitting in the unlicensed spectrum before it transmits DRS (or any other downlink signals for that matter). This means that from a UE perspective, the eNB may be unable to transmit any particular DRS transmission. In certain regions, LBT functionality is required from a regulatory point of view to ensure fair coexistence of different radios and access technologies on the unlicensed band.

More specifically the transmitter node (which performs the LBT procedure, e.g. a terminal or radio node or network node like an eNB) determines whether the channel is free or occupied by measuring the energy on the medium over certain duration i.e. LBT measurement duration. If the channel is found to be free (the LBT procedure is successful), the transmitter node occupies the channel and can transmit during a channel occupancy time, which can range for certain number of time resources or a time interval, e.g. between 4 ms to 10 ms. If the channel is found to be occupied, on the other hand, the transmitter node refrains from transmitting and waits until the channel becomes free.

In order to determine whether the channel is occupied or not during a particular LBT duration, a transmitter mode measures the energy detected during the LBT measurement duration and computes or evaluates the corresponding power level. The power level is compared against a carrier sensing threshold, which may be referred to as a LBT threshold. If the power level is above the carrier sensing threshold, the channel is considered to be occupied. On the other hand, if the power level is below the threshold then the channel is considered to be free. The LBT may also interchangeably be referred to as a channel carrier sense multiple access (CSMA) scheme, channel assessment scheme, clear channel assessment (CCA) scheme etc. The CSMA or LBT based operation or procedure is more generally denoted as contention based operation. The contention based operation is typically used for transmission on carriers of an unlicensed band. But this mechanism may also be applied for operating on carriers belonging to a licensed band, for example to reduce interference.

As mentioned earlier, in Rel-14, in addition to the DL operation in the unlicensed spectrum, UL operation is also being introduced. This means that a UE may be configured with UL transmissions on one or more SCells (Secondary Cell of a CA) in the unlicensed spectrum and perform UL LBT if needed.

Standalone access of unlicensed spectrum using LTE is discussed in the following.

There will also be LTE systems operating in unlicensed spectrum in a standalone manner. The difference between LAA and "standalone LTE in unlicensed band" will be that there will not be any licensed carrier to be aggregated with an unlicensed carrier in standalone usage, while an unlicensed LTE carrier is always aggregated with licensed carrier in LAA operations. Standalone operation means that, UL will also be allowed in unlicensed spectrum usage of LTE. Since there will not be any support from a licensed carrier, the standalone LTE system is responsible for all functionalities in unlicensed spectrum.

In a standalone operation, a UE may be capable of only using a single carrier, or a plurality of single carriers, or be capable of aggregating more than one unlicensed carriers at the same. In that case, both PCell and SCell(s) will be in unlicensed spectrum.

LAA operation in dual connectivity mode is discussed in the following.

The unlicensed carrier can also be aggregated with a licensed carrier in dual connectivity manner. In dual connectivity mode, at least one CC (Component Carrier) in a MeNB is termed as PCell and at least one CC in a SeNB is termed as PSCell. PCell and PSCell may be functionally similar, and e.g. used for controls signaling. However activation/deactivation/configuration/deconfiguration of a PSCell is controlled by the PCell. The connected nodes in DC operation are independent to each other, thus, all control signaling is done separately.

License-shared operation of LTE is discussed in the following.

In a licensed shared spectrum, more than one RAT (Radio Access Technology, e.g. LTE or NR) has the permission to access the spectrum, where all the RATs have equal status in terms of priority. The allowed systems access the spectrum based on a fairness criterion, e.g. LBT. This is also called horizontal sharing of the spectrum. In the future, LTE may also be used in such spectrum scenarios.

Another variation of shared licensed operation utilises spectrum with varying levels of priority of one or more licensed access technologies, as well as one or more unlicensed technologies, such as the CBRS system in the USA which operates in the 3550 to 3700 MHz range. The CBRS spectrum is allocated in decreasing order of priority to (i) incumbent radar operations, (ii) priority access license (PAL) users and (iii) general access unlicensed users.

The 5.9 GHz spectrum allocation of the spectrum band between 5850 MHz and 5925 MHz as is allocated to ITS services in USA is shown as an example of shared spectrum in FIG. 3.

In Europe, the band 5875-5905 MHZ is allocated to Safety-ITS, while 5905-5925 MHz has been defined as possible ITS extension in ECC Dec (08)01 and 5855-5875 MHz has been identified as potential non-safety ITS (ECC Rec (08)01, see FIG. 4.

In addition, WRC-19 is considering additional allocation for RLAN in the 5 GHz band (A11.16) under the condition that mitigation techniques are applied to protect incumbents Devices in unlicensed spectrum, may need to always listen to the channel (performing an LBT procedure) that they intend to use before sending any transmission. This creates an additional processing effort on the devices, affecting their battery life. In addition, they tend to transmit full output power since there is no network control. This creates the maximum adjacent channel and in-channel interference as well as increase the power consumption in the device. For example the V2X operation can be adversely affected if the transmission is delayed too long due to lack of available resources. The repeated sensing of channel on different carriers also drains terminal/UE power, deteriorating its battery life.

There is generally proposed taking advantage of the use of a cellular technology in unlicensed spectrum and the support obtained by a licensed band to optimize the processing in the device as well as the levels of interference in unlicensed spectrum.

In particular, there may be considered a terminal or UE adapted for carrying one or more of the following steps. Also, a method for operating a terminal or UE is described, comprising one or more of the following steps:

Step-1 (optionally): Receiving from a network node information about load (information pertaining to operational conditions) on one or more carrier(s) (representing LBT communication links of a set of such links) in unlicensed spectrum (or in license-exempt spectrum or in a spectrum where LBT is required) on which the UE can perform D2D or V2X operation, e.g. on a sidelink of the one or more carriers (i.e., using the carrier/s for the sidelink/D2D communication) based on a LBT or carrier sensing procedure. The terminal may comprise a corresponding receiver and/or receiving module.

Step-2 (optionally): Determining whether to perform D2D or V2X operation (transmission) on the carrier/s and/or sidelink of the one or more carriers based on the received information; this may be considered an example of determining whether to perform an LBT procedure on a communication link/carrier, as D2D operation/transmission requires such a LBT procedure. The terminal may comprise corresponding control circuitry and/or a determining module.

Step-3: Performing the D2D/V2X operation on the one or more carriers based on the determining of step-2. Step-3, e,g. based on and/or including step-2, may be considered to represent performing a LBT procedure based on information received. The terminal may comprise a corresponding transmitting or operation module, and/or corresponding control circuitry and/or radio circuitry, and/or transmitting circuitry and/or LBT circuitry.

Step-4: (Optionally) Transmitting or sending control information, e.g. information related to current received signals levels and/or received signal patterns in one or more carrier(s) in unlicensed spectrum (or in license-exempt spectrum or in a spectrum where LBT is required) and/or the results of V2X operation, to another terminal/UE and/or to a serving network node.

The terminal may comprise a corresponding transmitting module and/or transmitting circuitry.

Step-5: Optionally saving the transmission configurations of one or more carriers in unlicensed spectrum (or in license-exempt spectrum or in a spectrum where LBT is required). The terminal may comprise a corresponding memory and/or storage and/or control circuitry and/or storing module.

There is also described a radio node or network node adapted for carrying out one or more of the following steps, as well as a method for operating a radio node (the radio node may in particular be a RSU) or network node, the method comprising one or more of the following steps:

Step-1N: Determining one or more carriers for sidelink operation in unlicensed spectrum (or in license-exempt spectrum or in a spectrum where LBT is required) in which a UE should perform a LBT procedure (like a carrier sensing procedure and/or pattern recognition) before transmitting signals on the sidelink for D2D/V2X operation of these carriers. The radio node or network node may comprise a corresponding determining module and/or corresponding control circuitry.

Step-2N: Obtaining information about received signal levels and/or received signal patterns of the determined one or more carriers in unlicensed spectrum (or in license-exempt spectrum or in a spectrum where LBT is required). The radio node or network node may comprise corresponding radio circuitry, e.g. receiving circuitry, and/or control circuitry, and/or a corresponding information module.

Step-2AN: Obtaining may further comprise collecting information about received signal levels and/or received signal patterns of one or more carriers in unlicensed spectrum (or in license-exempt spectrum or in a spectrum where LBT is required) from other UEs. The network node may comprise a corresponding receiving circuitry and/or LBT circuitry and/or radio circuitry and/or control circuitry, and/or a corresponding obtaining module.

Step-3N Transmitting the obtained information in step-2 to a terminal or UE and/or another network node. The radio node or network node may comprise a corresponding transmitting circuitry for use in such transmitting, and/or a corresponding transmitting module.

Step-4N: Optionally saving at least one of the received signal levels and/or received signal patterns for one or more carriers in unlicensed spectrum (or in license-exempt spectrum or in a spectrum where LBT is required). The radio node or network node may comprise a corresponding storing module and/or control circuitry and/or memory.

At least the following advantages can be envisioned with the proposed solutions:

The proposed solution will increase the battery life of the device by reducing the amount of processing The proposed solutions will also reduce the interference level by reducing the in-band power (and thus the adjacent band unwanted emissions).

The solution also utilizes the existence of a licensed carrier in a cellular system to coordinate transmissions in an unlicensed band (or spectrum)

Any two or more variants described in this disclosure may be combined in any suitable way with each other, e.g. in a system comprising a terminal and a network node.

Furthermore, even though the examples herein are given in the LTE and/or LAA context, the variants described herein are not limited to LTE and/or LAA. The described variants are not limited to LTE either, but can be adapted in other RATs too, e.g., UTRA, LTE-Advanced, 5G, NX, NB-IoT, WiFi, BlueTooth, etc., or even for peer-to-peer, D2D or V2X communication.

The terms "UL channel", "UL signal", "radio transmission", "UL transmission" are used herein interchangeably. Also, even though the examples and variants herein are described for a specific UL channel (PRACH), the variants can also be applicable for other channels or signal transmissions (UL channels or UL signal transmission, or channels or signal transmissions for peer-to-peer, D2D or V2X communication).

Pertaining to some variants, a non-limiting term "UE" is used. The UE herein can be any type of wireless device capable of communicating with network node or another UE over radio signals, and/or be considered a representation of a terminal. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some variants generic terminology "network node", is used. It can be any kind of network node which may comprise of a radio network node such as base station, radio base station, base transceiver station, base station controller, network controller, evolved Node B (eNB), Node B, gNodeB, MeNB, SeNB, Multi-cell/multicast Coordination Entity (MCE), relay node, access point, radio access point, Remote Radio Unit (RRU) Remote Radio Head (RRH), a core network node (e.g., MME, SON node, a coordinating node, positioning node, MDT node, etc.), or even an external node (e.g., $3^{rd}$ party node, a node external to the current network), etc.

In some variants, the generic terminology Primary Serving Cell (PCell), Primary Secondary Cell (PSCell) and Secondary (Serving) Cell (SCell) is used. These terms may refer to different types of serving cells which a certain UE is configured to use. Other terms which may be used for these terms are Primary Component Carrier (PCC), Primary Secondary Component Carrier (PSCC), Secondary Component Carrier (SCC), respectively.

The term "radio node" used herein may be used to denote a terminal or UE, or a radio network node.

The variants are applicable to single carrier, as well as to multicarrier or carrier aggregation (CA) operation of the UE, in which the UE is able to receive and/or transmit data to more than one serving cells. The term carrier aggregation (CA) may also be referred to as "multi-carrier system", "multi-cell operation", "multi-carrier operation", "multi-carrier" transmission and/or reception. In CA, one of the component carriers (CCs) is the primary component carrier (PCC) or simply primary carrier or even anchor carrier. The remaining ones are called secondary component carrier (SCC) or simply secondary carriers or supplementary carriers. The serving cell is interchangeably called primary cell (PCell) or primary serving cell (PSC). Similarly, the secondary serving cell is interchangeably called secondary cell (SCell) or secondary serving cell (SSC).

In Dual Connectivity (DC) operation, the terminal or UE can be served by at least two nodes called master eNB (MeNB) and secondary eNB (SeNB). More generally, in multiple connectivity (sometimes referred to as multi-connectivity) operation the terminal or UE can be served by two or more nodes e.g. MeNB, SeNB1, SeNB2 and so on. The UE is configured with PCC from both MeNB and SeNB. The PCell from MeNB and SeNB are called PCell and PSCell respectively. The PCell and PSCell operate the terminal or UE typically independently (i.e., the respective cells are managed independently by the respective nodes). The UE is also configured with one or more SCCs from each of MeNB and SeNB. The corresponding secondary serving cells served by MeNB and SeNB are called SCell. The UE in DC typically has separate TX/RX (transmission/reception) for each of the connections with MeNB and SeNB. This allows the MeNB and SeNB to independently configure the UE with one or more procedures e.g. radio link monitoring (RLM), DRX cycle etc., on their PCell and PSCell respectively. The methods and variants are applicable to both CA, DC and Multi-Connectivity (MC).

The term "signaling" used herein may comprise any of: high-layer signaling (e.g., via RRC), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term DRS or discover (or discovery) signal may comprise any type of reference signal, which can be used by the UE for performing one or more measurements. Examples of DRS are CRS, CSI-RS, PSS, SSS, MBSFN RS etc. One or more DRS may be transmitted in the same DRS time resource. Examples of DRS time resource are symbol, subframe, slot etc.

The term "measurement" herein refers to radio measurements. Some examples of the radio measurements are: RSSI measurement, channel occupancy measurement, WiFi RSSI measurement, signal strength or signal power measurements (e.g., RSRP or CSI-RSRP), signal quality measurements (e.g., RSRQ, SINR), timing measurements (e.g., Rx-Tx, RSTD, RTT, TOA), radio link monitoring measurements (RLM), CSI, PMI, cell detection, cell identification, number of successful reports, number of ACKs/NACKs, failure rate, error rate, etc. The measurements may be absolute or relative (e.g., absolute RSRP and relative RSRP). The measurements may be performed for one or more different purpose, e.g., LBT, RRM, SON, positioning, MDT, etc. The measurements may be, e.g., intra-frequency measurements, inter-frequency measurements, or CA measurements. The measurements may be performed in the licensed and/or unlicensed spectrum. The measurements or measurement reporting may be single measurements, periodic or aperiodic, event-triggered, logged measurements, etc.

The term LBT or LBT procedure may correspond to any type of CSMA or CCA procedure or mechanism which is performed by a node on a carrier before deciding to transmit signals on that carrier. CSMA or LBT may also interchangeably be called clear channel assessment (CCA), clear channel determination etc. The transmission of signals on a carrier subjected to LBT is also called contention based transmission. On the other hand, the transmission of signals on a carrier which is not subjected to LBT is also called contention free transmission. Contention free transmission may also be interchangeably called non-contention based transmission or operation.

The approaches described herein are applicable for "LAA", "eLAA", "unlicensed operation", "operation in unlicensed band", "standalone LTE", "unlicensed operation", "license shared operation", "LSA operation", "operation under frame structure type 3", "operation with LBT", such terms may be used interchangeably, unless otherwise stated.

The variants are applicable for any type of LBT based approaches, in particular in the context of D2D operation, especially for V2X operation on sidelink, e.g. V2V, V2I, V2P etc. The variants are also applicable to any type of operation on sidelink e.g. D2D operation, ProSe operation, V2X operation, etc.

The steps discussed in the context of a terminal are discussed in more detail in the following.

Step-1: In a first variant, the terminal or UE receives information from a network node about one or more carriers in which the UE may or may not perform V2X operation on the sidelink. The received information mainly depicts interference or load situation on one or more carriers which can be used for V2X operation by the UE on the sidelink of these carriers. The received information may comprise of information as described in the network node variants below. The received information can be separately associated for each carrier or link, e.g. for each carrier or link of the set of communication links, corresponding information may be provided (if available).

For example, in one variant the received information may comprise the signal levels and/or a signal pattern in a channel (or carrier) in unlicensed spectrum (or in license-exempt spectrum or in a spectrum where LBT is required), which the UE can use for V2X operation.

In another variant, the UE may be informed about the load situation on one or more carriers. The load information may comprise of two or more levels as described in below. In one example the load may be 2-level indication: no or low load and high or full load. In another example the 2-level indication may indicate whether the UE should perform V2X operation on the sidelink of the carrier or not. In another example the UE may be informed whether a load on a carrier is low, medium or high. A 2-level indication generally may be represented by a bit or flag.

650 In yet another example the UE may be informed the load situation in terms of percentage or ratio with respect to a reference value. An example of the reference value is maximum possible load on a carrier e.g. when all resources in carrier are used.

Step-2

In this step the UE may use the received information about load situation on the indicated carriers from the network node to determine whether to perform channel access procedure (e.g. sensing, LBT, CCA etc) for transmit V2X related signals on the sidelink of one or more indicated carriers.

In one example, if the indicated load is high on the carrier, then the UE may decide not to perform carrier sensing on such carrier. In another example, the UE may only perform carrier sensing on a carrier which has lowest load.

In yet another variant, the UE may also perform one or more radio measurements on one or more carriers whose load situation is indicated by the network node to the UE. In this case, the UE may combine the results of its own measurements with the indicated load on those carriers to determine whether the UE should access the channel on those carriers or not i.e. whether or not perform carrier sensing for transmitting on sidelinks of such carriers. For example, the UE may further signal level measurement result with a threshold. It may be considered that the UE may access a channel or carrier for V2X operation if the load indicated by the network node on that carrier is below a certain threshold, and also the received signal estimated by the UE itself is also below a certain threshold. In one example, the threshold and reference signal used for measurements are known by the UE, e.g. from a preconfiguration and/or stored in memory. They can also be signaled to the UE from a network node (or any other node, e.g. another UE). The threshold level can be defined based on any of the following:

It can be pre-defined based on expected wireless systems in certain unlicensed spectrum and known to the UE. The predefined level can vary with geographical region.

It can be pre-defined based on expected wireless systems in certain unlicensed spectrum and signaled to the UE from a network node. The predefined level can vary with geographical region.

The threshold level can be calculated by the UE based on certain known constraints, such as maximum allowed power levels in any spectrum, maximum allowed transmission bandwidth, etc In some variant, there may be multiple threshold levels for any certain carrier. Example reference patterns (signal patterns) can be any of the following:

It can be preamble transmissions from any wireless system

It can be some form predefined signals, e.g. with certain periodicity, etc

The above mentioned comparison may be done at the same time or sequentially. The above mentioned UE measurement for one or more carriers in unlicensed spectrum (or in license-exempt spectrum or in a spectrum where LBT is required) can also be any measurement of the one or more of the following:

RSRP (Reference Signal Received Power),
RSRQ (Reference Signal Received Quality),
RSSI (Reference Signal Strength Indicator)
RS-SINR (Reference Signal Signal-To-Interference and Noise Ratio)
any other channel estimation information
any information related to signal structure, e.g. modulation format, etc
V2V message latency
V2V message periodicity
V2V message intensity (i.e. the number of simultaneous V2V messages in a cell)
V2V message traffic patterns
V2V transmit power Step-3

In this step, the UE may perform carrier sensing (LBT) for V2X operation on the sidelink of the carrier which is selected or determined by the UE in step-2.

If the carrier sensing procedure is successful, then the UE may allocate or reserve one or more radio resources on the SL of the carrier for certain time period (T2), or directly start transmission. If the resources are reserved, then the UE may perform V2X operation during T2. For example, the UE may transmit radio signals on the SL.

Step-4

In this step, the UE may transmit information about the use of V2X operation on SL of one or more carriers to another UE and/or to the network node. For example, the UE may indicate to the network node (e.g. a network node operating in the licensed spectrum) which carriers are used or expected to be used by the UE and/or which carriers cannot be used until certain time period (T3), not used or not expected to be used for certain time (T4) for V2X operation e.g. due to high load.

Step-5: Optionally saving the transmission configurations of one or more carriers in unlicensed spectrum (or in license-exempt spectrum or in a spectrum where LBT is required). The UE optionally saves the transmission configuration(s) that is used in one or more carriers in unlicensed spectrum. The UE may save this information for future use. For example, the UE may send statistics to the network node, which may use for radio network planning, tuning of parameters etc.

The steps discussed in the context of a radio node or network node are discussed in more detail in the following.

Step-1N:

In this step, the terminal or network node may determine if one or more UEs are operating or expected to operate in sidelink of one or more carriers in unlicensed spectrum (or in license-exempt spectrum or in a spectrum where LBT is required). The network node may further determine that the UE should perform the carrier sensing (or pattern recognition) in the determined carriers before transmitting signals on the sidelinks of these carriers. The first network node can operate on carriers which may belong to either licensed band or unlicensed band.

Step-2N:

In this step, the network node may obtain information about received signal levels and/or received signal patterns of the determined one or more carriers in unlicensed spectrum (or in license-exempt spectrum or in a spectrum where LBT is required). The network node may obtain, collect or gather the above mentioned information for at least one determined carrier frequency by one or more of the following mechanisms:

By autonomous receiving signals on the determined at least one carrier in which sidelink (SL) operation of the UE is taking place or is expected to take place.
By receiving information from another network node,
By receiving information from one or more UEs.
Based on historical data or statistics e.g. pattern of received signals.

The above mentioned information which is obtained by the network node may comprise or represent one or more of the following:

Received signal levels of signals transmitted by the UE e.g. received signal level of any signal. Examples of signals are physical signal (e.g. reference signal), physical channel
Received signal patterns
Signal strength e.g. path loss, RSRP, sidelink RSRP (S-RSRP) etc.
Signal quality e.g. RSRQ, SNR, SINR, BLER (Block Error Rate), etc.
Received interference or total power e.g. RSSI, SL RSSI (S-RSSI)
Channel reception performance e.g. reception quality of data channel, reception of control channel etc.
Any channel estimation information
any information related to signal structure, e.g. modulation format, etc.
any information related to transport format, e.g. transport block size, coding rate, etc.

Figure 5:
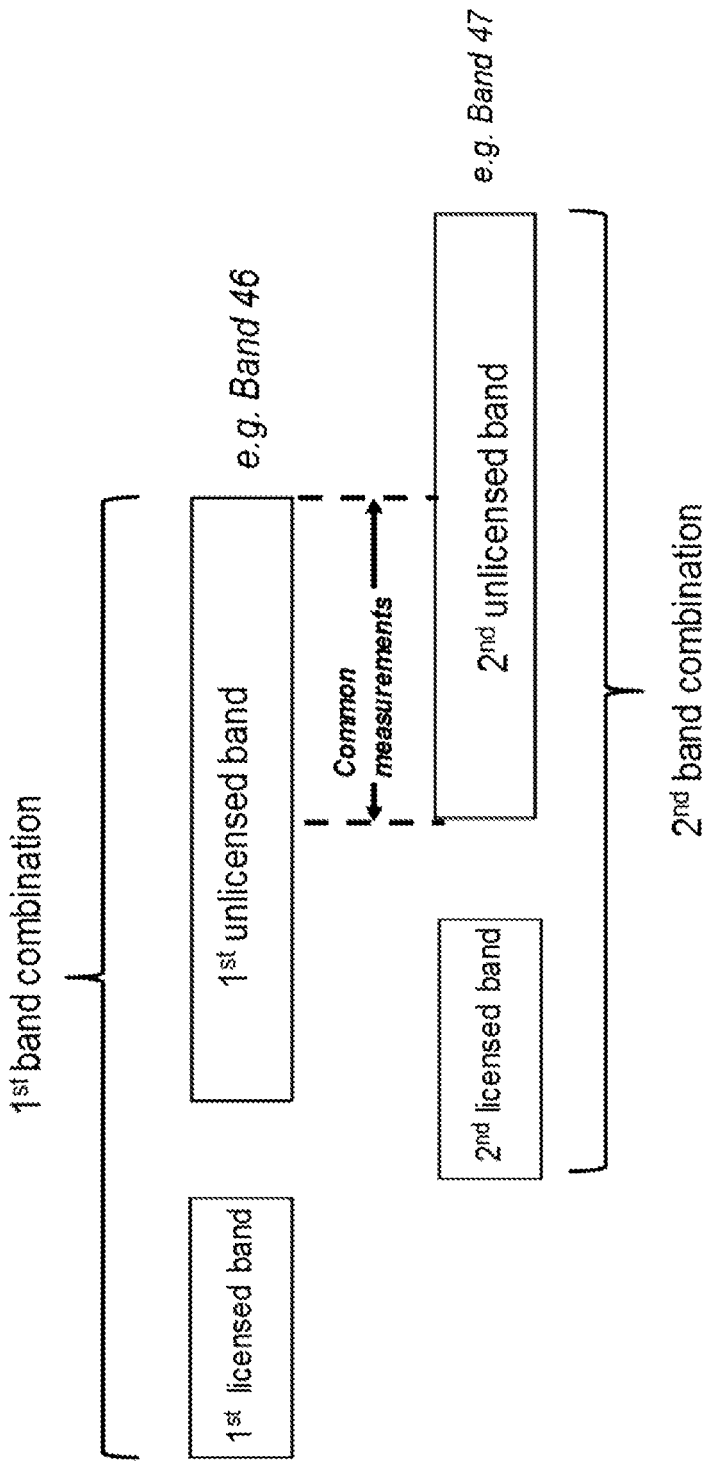
FIG. 5, showing exemplary band combination overlap.

In one instantiation of this variant, the network node may collect measurements and information from UEs in a first licensed/unlicensed band combination that the network node serves and use the information from the measurements to support scheduling of UEs in a second licensed/unlicensed band combination that the network nodes supports. The unlicensed bands in the first and second licensed/unlicensed band combinations may fully or partially overlap—i.e. LTE bands 46 and 47, or bands 42 and 48) and hence measurements from UEs in one unlicensed band may be employed to accurately assess the channels of UEs in the second unlicensed band. FIG. 5 shows a possible LTE band overlap.

In a second instantiation of this variant, the carrier may support multiple priority of users in a band. Measurements from UE's of a first priority in the band may be employed to assist the network node in scheduling resources of UEs of a second priority level in the band served by the same network node. In another example, measurements of non-safety traffic V2V transmissions may be employed to optimize transmission of V2V traffic safety messages in the same or different unlicensed spectrum.

In a third aspect of this variant, the network node may compile the obtained information and determine overall load situation on different determined information. The load information may be indicated in two or more levels. One example of 2-level load indication is: channel on carrier is available (ID=1) or unavailable (ID=0). Another example of multi-level load indication is: no load, low load, medium load, high load and full load. For example, the network node may determine that load on a carrier by combining the results of two or more radio measurements e.g. if signal quality is below threshold and received interference is above threshold then the network node may determine that the load is medium or high.

Step-3N:

In this step, the network node may transmit information obtained in step-2 to a UE and/or other network nodes, e.g. for operation on sidelink of one or more carriers in unlicensed spectrum (or in license-exempt spectrum or in a spectrum where LBT is required). The above mentioned information may include one or more of the following:

Indication about the determined load situation on the carrier e.g. channel number of the carrier such as ARFCN or EARFCN etc.

Indication whether the carrier should be used or not for SL operation based on carrier sensing procedure.

Obtained radio measurement results e.g. signal quality, signal strength, interference etc.

Suggested transmit power levels

Expected interference levels

Information regarding occupancy of the said carrier (or channel), i.e. whether the said channel is free or not The second network nodes may serve UEs with the same licensed/unlicensed band combination; a licensed/unlicensed combination with the same unlicensed band, but a differing licensed band; or a licensed/unlicensed combination with both licensed and unlicensed bands differing.

Step-4N:

Optionally the network node saves at least one of the received signal levels and/or received signal patterns for one or more carriers in unlicensed spectrum (or in license-exempt spectrum or in a spectrum where LBT is required). The network node may use this for one or more operational tasks. Examples of tasks are adjustment of transmit power, power control operation of the UEs, scheduling of UEs in UL and/or DL etc.

Figure 6:
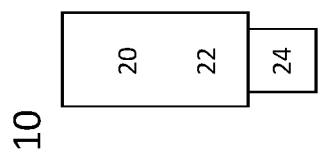
FIG. 6, showing an exemplary terminal.

FIG. 6 schematically shows a terminal 10, which may be implemented in this example as a user equipment. Terminal 10 comprises control circuitry 20, which may comprise a controller connected to a memory. Any module of the terminal, e.g. receiving module and/or transmitting module and/or decoding module, may be implemented in and/or executable by the terminal, in particular the control circuitry 20, in particular as module in the controller. Terminal 10 also comprises radio circuitry 22 providing receiving and transmitting or transceiving functionality, the radio circuitry 22 (operably, e.g. to be controlled by the control circuitry) connected or connectable to the control circuitry. An antenna circuitry 24 of the terminal 10 is connected or connectable to the radio circuitry 22 to receive or collect or send and/or amplify signals. Radio circuitry 22 and the control circuitry 20 controlling it may be adapted for V2x and/or D2D communication. The terminal 10 may be adapted to carry out any of the methods for operating a terminal disclosed herein; in particular, it may comprise corresponding circuitry, e.g. control circuitry.

Figure 7:
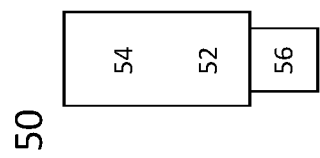
FIG. 7, showing another exemplary terminal.

FIG. 7 shows another example of a terminal 50. Terminal 50 may comprise LBT circuitry 52, for performing a LBT procedure. It may be considered that terminal 50 comprises control circuitry 54 for controlling operations of the terminal, in particular a LBT procedure performed utilising LBT circuitry 52. The terminal may comprise antenna circuitry 56, which may be connected to LBT circuitry 52 and/or control circuitry 54.

Figure 8:
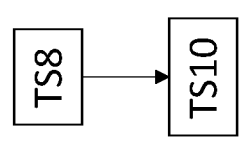
FIG. 8, showing an exemplary method for operating a terminal, respectively a corresponding algorithm.

FIG. 8 shows a method for operating a terminal, which may be any of the terminals described herein. The method may comprise an action TS10 of performing a Listen-Before-Talk, LBT, procedure on at least one LBT communication link of a set of LBT communication links, wherein performing the LBT procedure is based on information received by the terminal, the received information pertaining to operational conditions of the LBT communication links of the set of LBT communications links. The method may optionally comprise an action TS8 of receiving the information from a network node or another terminal.

Figure 9:
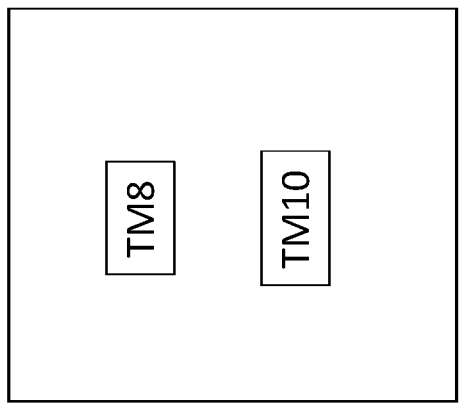
FIG. 9, showing another exemplary terminal.

FIG. 9 shows a terminal, which may be any of the terminals described herein. The terminal may comprise a LBT module TM10 for performing action TS10. Optionally, the terminal may comprise a receiving module TM8 for performing action TS8.

Figure 10:
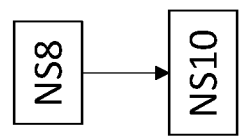
FIG. 10, showing an exemplary method for operating a radio node or network node, respectively a corresponding algorithm.

FIG. 10 shows a method for operating a radio node or network node, which may be any of the radio nodes or network nodes described herein. The method may comprise an action NS10 of transmitting information pertaining to operational conditions of Listen-Before-Talk, LBT, communication links of a set of LBT communication links, e.g. to a terminal (or more than one terminal). The method may comprise an optional action NS8 of determining such information, e.g. based on monitoring and/or scheduling information.

Figure 11:
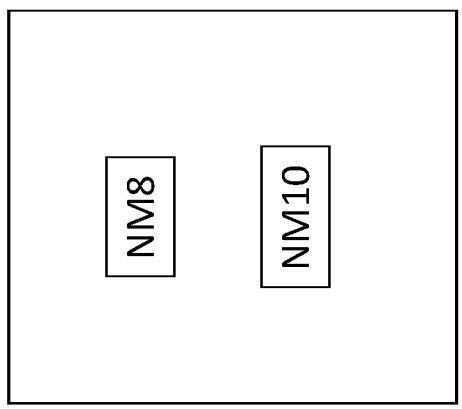
FIG. 11, showing an exemplary radio node or network node.

FIG. 11 shows a radio node or network node, which may be any of the radio nodes or network nodes described herein. The radio node or network node may comprise a transmitting module NM10 for performing action NS10. Optionally, the radio node or network node may comprise a determining module NM8 for performing action NS8.

Figure 12:
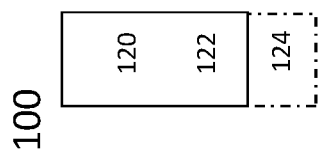
FIG. 12, showing another exemplary radio node.

FIG. 12 shows an exemplary radio node 100, which may be implemented as a network node. Radio node 100 comprises control circuitry 120, which may comprise a controller connected to a memory. Any module, e.g. receiving module and/or transmitting module and/or configuring module (e.g., for configuring a terminal) of the radio node may be implemented in and/or executable by the control circuitry 120. The control circuitry 120 is connected to control radio circuitry 122 of the network node 100, which provides receiver and transmitter and/or transceiver functionality, and/or may be implemented as, or part of, LBT circuitry. An antenna circuitry 124 may be connected or connectable to radio circuitry 122 for signal reception or transmittance and/or amplification. The radio node 100 may be adapted to carry out any of the methods for operating a radio node or network node disclosed herein; in particular, it may comprise corresponding circuitry, e.g. control circuitry. The antenna circuitry may be connected to and/or comprise an antenna array.

LBT circuitry may generally be implemented as, and/or comprise radio circuitry and/or control circuitry and/or measurement circuitry. It may be considered that LBT circuitry is connected or connectable to antenna circuitry, for signal transport. LBT circuitry may comprise measurement circuitry and/or a measurement arrangement (or circuitry) to perform and/or evaluate one or more measurements for CCA/LBT, e.g. of power and/or energy (or related parameters, e.g. respective densities or averages), on a channel or carrier or frequency range. Transmitting circuitry may be implemented as, and/or comprise, on or more transmitters. Receiving circuitry may be implemented as, and/or comprise, one or more receivers.

There may be considered a network node adapted for performing any one of the methods for operating a network node described herein.

There may be considered a terminal or user equipment adapted for performing any one of the methods for operating a radio node described herein.

There is also disclosed a program product comprising code executable by control circuitry, the code causing the control circuitry to carry out and/or control any one of the method for operating a radio node as described herein, in particular if executed on control circuitry, which may be control circuitry of a user equipment or a network node.

Moreover, there is disclosed a carrier (or storage) medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or or optically transmissive material, e.g. glass fiber, and/or cable. A storage medium may comprise at least one of a memory, which may be volatile or non-volatile, a buffer, a cache, an optical disc, magnetic memory, flash memory, etc.

Resources may generally comprise time/frequency resources for communication, and/or associated power and/or or codes, e.g. depending on the multiplexing scheme used. References to resources, radio resources and/or time and/or frequency resources (e.g., subframe, slot, symbol or resource block) may refer to such resources structured according to 3GPP standards, in particular LTE and/or NR. It may be considered that decoding may comprise decoding of error detection coding and/or forward error coding. The extracted information may generally be and/or comprise control information, in particular in a scheduling assignment. It may be considered that the extracted information is received on a control channel and/or is based on control channel signaling. Control channel signaling may in particular be signaling on a physical control channel.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device, and/or one or more receivers and/or transmitters and/or transceivers. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Reference signaling in the uplink may be associated to a terminal, e.g. SRS. A terminal may in particular be adapted for V2x communication. A terminal may be adapted for one or more (cellular) Radio Access Technologies (RATs), e.g. LTE and/or UMTS and/or a 5G RAT, e.g. LTE Evolution and/or NR). Generally, a terminal may be any device adapted for wireless communication via D2D and/or one or more cellular RATs. A wireless communication network may comprise two or more terminals communicating via D2D communication, and/or a terminal communicating with a radio access node of a RAN (Radio Access Network) implementing one or more RATs. Such a radio access node may e.g. be an eNodeB. It may generally be considered that a terminal represents a device capable of serving as an end or termination point of a communication. A terminal may be a user equipment or phone or smart phone or computing device or sensor device or machine or vehicular device adapted for wireless communication as described herein. A terminal adapted for D2D communication may in particular adapted for V2x and/or V2V and/or V2P and/or V2I communication. It may be considered that a terminal is mobile. However, there may be envisioned variants in which a terminal is stationary.

A radio node or network node or base station may be any kind of radio node or base station of a wireless and/or cellular network adapted to serve one or more terminals or user equipments. It may be considered that a base station is a node or network node of a wireless communication network. A radio node or network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or radio node is adapted for one or more RATs, in particular LTE/E-UTRA. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate. A radio node may generally be a network node or a terminal and/or user equipment.

A carrier aggregate may generally comprise a plurality of carriers, wherein one carrier may be a primary carrier and/or other carriers may be secondary carriers. It may be considered that carriers of a carrier aggregate are synchronized according to a pre-defined time structure and/or in relation to a synchronizing carrier, which may be a primary carrier. A primary carrier may be a carrier on which control information and/or scheduling data is transmitted and/or which carries one or more control channels for the carrier aggregate and/or one or more carriers. A carrier aggregate may comprise UL carrier/s and/or DL carrier/s. A carrier aggregate may comprise one or more LBT carriers. It may be considered that a carrier aggregate additionally comprises one or more carriers for which no LBT procedure for access is performed, e.g., licensed carriers. A primary carried may be such a carrier, in particular a licensed carrier. Accordingly, in some variants a carrier for which LBT is performed may be in a carrier aggregate comprising at least one carrier for which no LBT is performed, in particular a licensed carrier. A licensed carrier may generally be a carrier licensed for a specific Radio Access Technology (RAT), e.g., LTE. A radio node may in particular be a user equipment or a base station and/or relay node and/or micro-(or pico/femto/nano-)node of or for a network, e.g., an eNodeB. Transmission of data may be in uplink (UL) for transmissions from a user equipment to a base station/node/network. Transmission of data may be considered in downlink (DL) for transmission from a base station/node/network to a user equipment. The target of transmission may generally be another radio node, in particular a radio node as described herein.

A LBT procedure may comprise one or more Clear Channel Assessment (CCA, may also be called Clear Carrier Assessment) procedures. A CCA procedure may generally comprise sensing and/or determining the energy and/or power received on or for the channel or carrier (by the radio node performing the CCA procedure) the LBT procedure is performed on and/or pertains to, in particular over a time interval or duration, which may be called the CCA interval or duration. Generally, different CCA procedures may have different CCA intervals or durations, e.g., according to a configuration. The number of CCA procedures to be performed for a LBT procedure may be dependent on a backoff counter, which may be random and/or be based on one or more parameters as described herein. A CCA may indicate that a carrier or channel is idle if the power and/or energy sensed or determined is below a threshold, which may be a pre-determine threshold and/or be determined by the radio node, e.g., based on operating conditions and/or a configuration; if it is above or reaching the threshold, the carrier or channel may be indicated to be busy. A LBT procedure may be considered to determine that access to a carrier is allowed based on a number (e.g., a pre-determined number, e.g., according to a backoff counter) of CCAs performed indicating that the carrier or channel is idle. In some cases, the number may indicate a number of consecutive indications of the carrier being idle. It may be generally considered that the radio node is adapted for such sensing and/or determining and/or for carrying out CCA, e.g., by comprising suitable sensor equipment and/or circuitry and/or a corresponding sensing module. Such a sensing module may be part of and/or be implemented as or in a LBT module. Performing a LBT procedure to determine whether accessing a carrier or channel is allowed may include performing one or more CCA procedures on that carrier or channel. The LBT procedure may comprise a number of Clear Channel Assessments or CCA procedures, wherein the number may be larger than one and/or be based on a random backoff number or counter.

An eNodeB (eNB) may be envisioned as an example of a radio node or network node or base station, e.g. according to an LTE standard. A radio node or base station may generally be proximity service enabled and/or to provide corresponding services. It may be considered that a radio node base station is configured as or connected or connectable to an Evolved Packet Core (EPC) and/or to provide and/or connect to corresponding functionality. The functionality and/or multiple different functions of a radio node or base station may be distributed over one or more different devices and/or physical locations and/or nodes. A radio node or base station may be considered to be a node of a wireless communication network. Generally, a radio node or base station may be considered to be configured to be a coordinating node and/or to allocate resources in particular for cellular communication between two nodes or terminals of a wireless communication network, in particular two user equipments.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively or additionally, a cell may comprise at least one carrier for UL communication/transmission and DL communication/transmission, e.g., in TDD-based approaches.

A channel may generally be a logical or physical channel. A channel may comprise and/or be arranged on one or more carriers, in particular a plurality of subcarriers.

A wireless communication network may comprise at least one network node, in particular a network node as described herein. A terminal connected or communicating with a network may be considered to be connected or communicating with at least one network node, in particular any one of the network nodes described herein.

A carrier on which a LBT procedure and/or CCA and/or monitoring is performed may be an unlicensed carrier. However, in some cases, such a procedure/monitoring may be performed on a licensed carrier as well, e.g. to provide symmetric carrier handling or in a device easily adaptable for different frequency ranges.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB, may be adapted to provide and/or define and/or control one or more cells, e.g., a PCell and/or a LA cell.

A network node, in particular a base station, and/or a terminal, in particular a UE, may be adapted for communication in spectral bands (frequency bands) licensed and/or defined for LTE. In addition, a network node, in particular a base station/eNB, and/or a terminal, in particular a UE, may be adapted for communication in freely available and/or unlicensed/LTE-unlicensed spectral bands (frequency bands), e.g., around 5 GHz.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Generally, control circuitry may comprise integrated circuitry for processing and/or control, e.g., one or more processors and/or processor cores and/or FPGAs (Field Programmable Gate Array) and/or ASICs (Application Specific Integrated Circuitry). Control circuitry may comprise and/or be connected to and/or be adapted for accessing (e.g., writing to and/or reading from) memory, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory may be adapted to store code executable by control circuitry and/or other data, e.g., data pertaining to communication, e.g., configuration/s and/or address data of nodes, etc. Control circuitry may be adapted to control any of the methods described herein and/or to cause such methods to be performed, e.g., by the radio node. Corresponding instructions may be stored in the memory, which may be readable and/or readably connected to the control circuitry. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

Radio circuitry may comprise receiving circuitry (e.g., one or more receivers) and/or transmitting circuitry (e.g., one or more transmitters). Alternatively or additionally, radio circuitry may comprise transceiving circuitry for transmitting and receiving (e.g., one or more transceivers). It may be considered that radio circuitry comprises a sensing arrangement for performing LBT/CCA.

Radio circuitry may generally comprise, for example, a receiver device and/or transmitter device and/or transceiver device.

Antenna circuitry may comprise one or more antennas or antenna elements, which may be arranged in an antenna array. It may be considered that antenna circuitry comprises one or more additional elements and/or is connected or connectable to one or more additional elements, e.g., wiring and/or Configuring a radio node, in particular a user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding a freeze interval and/or a transmission start interval. A radio node may configure itself, e.g., based on configuration data received from a network or network node.

Generally, configuring may include determining configuration data representing the configuration and providing it to one or more other nodes (parallel and/or sequentially), which may transmit it further to the radio node (or another node, which may be repeated until it reaches the wireless device). Alternatively or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE.

A carrier may comprise a continuous or discontinuous radio frequency bandwidth and/or frequency distribution, and/or may carry, and/or be utilized or utilizable for transmitting, information and/or signals, in particular communication data. It may be considered that a carrier is defined by and/or referred to and/or indexed according to for example a standard like LTE. A carrier may comprise one or more subcarriers. A set of subcarriers (comprising at least one subcarrier) may be referred to as carrier, e.g., if a common LBT procedure (e.g., measuring the total energy/power for the set) is performed for the set. A channel may comprise at least one carrier. A channel may in particular be a physical channel and/or comprise and/or refer to a frequency range. Accessing a carrier or channel may comprise transmitting on the carrier. If accessing a carrier or channel is allowed, this may indicate that transmission on this carrier is allowed.

Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DMRS according to 3GPP and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Generally, V2x may be considered to comprise V2I (Vehicular to Infrastructure) V2P (Vehicular to Pedestrian) and/or V2V (Vehicular to Vehicular). It may be considered that V2x is or comprises one particular form of D2D communication.

D2D communication may comprise transmission and/or reception of data. It may be considered that D2D communication may generally comprise and/or be defined by data being transmitted from one terminal, e.g. the transmitter or transmitter terminal, (in particular directly) to another terminal, e.g. the receiver or receiver terminal, in particular without the data transmitted being transmitted and/or relayed via a cellular network and/or base station or radio node of such. D2D communication may comprise relaying and/or hopping via a plurality of terminals. It may be considered that D2D communication is supported by a network, e.g. by the network and/or base station or radio node providing resource allocation, e.g. allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g. as determined by a standard like LTE.

A channel may generally be a logical or physical channel. A channel may comprise and/or be arranged on one or more carriers, in particular a plurality of subcarriers. A control channel may be such a channel. A communication may generally involve transmitting and/or receiving messages, in particular in the form of packet data. A message or packet may comprise control and/or configuration data and/or payload data and/or represent and/or comprise a batch of physical layer transmissions. Control and/or configuration information or data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Generally, a message may comprise one or more signals and/or symbols.

Data may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

A communication link may comprise, and/or be based on, and/or represent, and/or be associated to, one or more channels and/or frequencies and/or frequency bands and/or carriers (representing, e.g., a frequency and/or frequency band) for transmission and/or reception, e.g. of signals and/or data. It may be considered that a communication link is a wireless link and/or pertains to an air interface and/or is based on electromagnetic radiation, in particular radio transmission (and/or microwave transmission), e.g. on the frequencies and/or carriers associated to the link. Generally, a communication link may be between two devices, e.g. two terminals (e.g., in a D2D/sidelink communication link) or between a terminal and a network node, e.g. comprising uplink and downlink carriers.

A communication link may be uni-directional, e.g. for transmission in only one direction, or bi- (or multi-)directional, allowing transmissions in more than one direction (direction in this context referring to a communication partner/transmission target). For bi- or multidirectional links, different carriers and/or frequencies may be associated to different directions, e.g. there may be different frequencies or carriers used in uplink than in downlink, or devices sharing a sidelink may use different frequencies and/or carriers for their transmission on the sidelink. A Listen-Before-Talk, LBT, communication link may refer to a communication link pertaining to which a device (like a terminal or radio node) has to perform and/or performs a LBT procedure before transmitting on and/or utilising the link for transmission. A LBT communication link may in particular be associated to frequency/ies in an unlicensed spectrum. A LBT communication link may comprise a carrier aggregation or carrier aggregate, and/or a dual connectivity connection. A communication link may be considered a LBT communication link if it comprises at least on carrier or frequency for which a LBT procedure is to be performed before transmission and/or for access. Transmitting on a LBT communication link and/or a corresponding carrier may comprise performing a (successful) LBT procedure. Accessing a LBT communication link and/or carrier may comprise transmitting on the LBT communication link and/or carrier.

A licensed band or spectrum may be a part of the frequency spectrum that is and/or has to be licensed for use, e.g. by a telecommunications operator. An unlicensed band or spectrum may be a part of the frequency spectrum that is available without such license. WLAN/WiFi usually uses such unlicensed bands. The requirements for using licensed bands are usually quite different from unlicensed bands, e.g. due to licensed bands being controlled by one operator, whereas unlicensed bands usually are not subject to a centralized operator. Thus, LBT procedures are usually required for unlicensed bands, which may be adapted to facilitate fair distribution of access to the unlicensed spectrum.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise:

| Abbreviation | Explanation |
|---|---|
| SL | Sidelink |
| LAA | Licensed Assisted Access |
| V2I | Vehicle to Infrastructure |
| V2N | Vehicle to Network |
| V2V | Vehicle to Vehicle |
| V2P | Vehicle to Person |
| UL | Uplink, from a termina/RSUI to a network node |
| DL | Downlink, from a network node to a terminal/RSU |
| RSU | Road Side Unit |
| SIR | Signal-to-Interference Ratio |
| SNR | Signal-to-Noise Ratio |
| SINR | Signal-to-Interference-and-Noise Ratio |

The invention claimed is:

1. A method of operating a user terminal in a wireless communication network, the method comprising:
performing a Listen-Before-Talk (LBT) procedure on at least one LBT communication link of a set of LBT communication links;
the performing the LBT procedure being based on information received by the user terminal, the user terminal receiving the information from a network node;
the received information pertaining to operational conditions of the LBT communication links of the set of LBT communications links, the received information pertaining to operational conditions pertaining to at least one of a load and a traffic on the LBT communication links;
determining whether to perform the LBT procedure by performing measurements on the LBT communication links of the set of LBT communication links, and determining whether to perform the LBT procedure based on the performed measurements and the received operational conditions of the LBT communication links of the set of LBT communications links, the user terminal determining to perform the LBT procedures when the received operational conditions are below a first threshold and the performed measurements on the LBT communication links of the set of LBT communication links are below a second threshold; and
after performing the LBT procedure on the at least one LBT communication link, sending control information to one or both of another terminal and a network node, the control information comprising information related to one or both of:
the operational conditions of the LBT communication links; and
a result of a V2X operation performed by the user terminal.

2. The method of claim 1, wherein the LBT communication links of the set of LBT communication links comprise Device To Device (D2D) communication links.

3. A user terminal for a wireless communication network, the terminal comprising:
Listen-Before-Talk (LBT) circuitry, the user terminal being configured to use the LBT circuitry for:
performing a LBT procedure on at least one LBT communication link of a set of LBT communication links;

the performing the LBT procedure being based on information received by the terminal, the user terminal receiving the information from a network node; and the received information pertaining to operational conditions of the LBT communication links of the set of LBT communications links, the received information pertaining to operational conditions pertaining to at least one of a load and a traffic on the LBT communication links; and determining whether to perform the LBT procedure by performing measurements on the LBT communication links of the set of LBT communication links, and determining whether to perform the LBT procedure based on the performed measurements and the received operational conditions of the LBT communication links of the set of LBT communications links, the user terminal determining to perform the LBT procedures when the received operational conditions are below a first threshold and the performed measurements on the LBT communication links of the set of LBT communication links are below a second threshold; and transmitting circuitry configured to, after performing the LBT procedure on the at least one LBT communication link, send control information to one or both of another user terminal and a network node, the control information comprising information related to one or both of:
  the operational conditions of the LBT communication links; and
  a result of a V2X operation performed by the user terminal.

4. The user terminal of claim 3, wherein the LBT communication links of the set of LBT communication links comprise Device To Device (D2D) communication links.

* * * * *